US012118266B2

(12) United States Patent
Rubin et al.

(10) Patent No.: US 12,118,266 B2
(45) Date of Patent: Oct. 15, 2024

(54) PLATFORM FOR PRODUCING AND DELIVERING MEDIA CONTENT

(71) Applicant: Descript, Inc., San Francisco, CA (US)

(72) Inventors: Steven Surmacz Rubin, San Francisco, CA (US); Ulf Schwekendiek, San Francisco, CA (US); David John Williams, San Francisco, CA (US)

(73) Assignee: Descript, Inc., San Francisco, CA (US)

( * ) Notice: Subject to any disclaimer, the term of this patent is extended or adjusted under 35 U.S.C. 154(b) by 287 days.

(21) Appl. No.: 17/652,610

(22) Filed: Feb. 25, 2022

(65) Prior Publication Data

US 2022/0374192 A1 Nov. 24, 2022

Related U.S. Application Data

(63) Continuation of application No. 16/600,095, filed on Oct. 11, 2019, now Pat. No. 11,262,970, which is a continuation of application No. 15/716,957, filed on Sep. 27, 2017, now Pat. No. 10,445,052.

(60) Provisional application No. 62/404,142, filed on Oct. 4, 2016.

(51) Int. Cl.
| | |
|---|---|
| *G06F 3/16* | (2006.01) |
| *G06F 16/61* | (2019.01) |
| *G06Q 10/101* | (2023.01) |
| *G10L 19/008* | (2013.01) |
| *G11B 27/031* | (2006.01) |
| *G11B 27/10* | (2006.01) |
| *G11B 27/34* | (2006.01) |

(52) U.S. Cl.
CPC ............. *G06F 3/16* (2013.01); *G06F 16/61* (2019.01); *G06Q 10/101* (2013.01); *G10L 19/008* (2013.01); *G11B 27/031* (2013.01); *G11B 27/10* (2013.01); *G11B 27/34* (2013.01); *G06F 3/167* (2013.01)

(58) Field of Classification Search
CPC ........ G06F 3/16; G06F 16/685; G11B 27/031
See application file for complete search history.

(56) References Cited

U.S. PATENT DOCUMENTS

| | | | |
|---|---|---|---|
| 5,649,060 A * | 7/1997 | Ellozy | G11B 27/10 704/235 |
| 5,682,326 A | 10/1997 | Klingler et al. | |
| 6,871,107 B1 | 3/2005 | Townsend et al. | |
| 7,461,004 B2 * | 12/2008 | Cormack | H04H 60/37 704/251 |
| 8,306,816 B2 | 11/2012 | Goldberg | |

(Continued)

*Primary Examiner* — Joseph Saunders, Jr.
(74) *Attorney, Agent, or Firm* — Perkins Coie LLP; Andrew T. Pettit

(57) ABSTRACT

Media content can be created and/or modified using a network-accessible platform. Scripts for content-based experiences could be readily created using one or more interfaces generated by the network-accessible platform. For example, a script for a content-based experience could be created using an interface that permits triggers to be inserted directly into the script. Interface(s) may also allow different media formats to be easily aligned for post-processing. For example, a transcript and an audio file may be dynamically aligned so that the network-accessible platform can globally reflect changes made to either item. User feedback may also be presented directly on the interface(s) so that modifications can be made based on actual user experiences.

13 Claims, 16 Drawing Sheets

(56) References Cited

U.S. PATENT DOCUMENTS

| | | | |
|---|---|---|---|
| 8,504,369 | B1 | 8/2013 | Chigier et al. |
| 9,066,049 | B2 | 6/2015 | Scoggins, II et al. |
| 9,318,110 | B2* | 4/2016 | Roe .................. G10L 15/26 |
| 9,432,516 | B1 | 8/2016 | Barbulescu et al. |
| 9,870,796 | B2 | 1/2018 | Goldberg |
| 9,940,632 | B2 | 4/2018 | Harb |
| 10,242,669 | B1 | 3/2019 | Sandler et al. |
| 2002/0007371 | A1* | 1/2002 | Bray .................. H04N 21/4394 348/E5.122 |
| 2002/0095290 | A1 | 7/2002 | Kahn et al. |
| 2002/0152076 | A1 | 10/2002 | Kahn et al. |
| 2003/0004724 | A1 | 1/2003 | Kahn et al. |
| 2005/0131559 | A1 | 6/2005 | Kahn et al. |
| 2005/0183109 | A1 | 8/2005 | Basson et al. |
| 2006/0072727 | A1 | 4/2006 | Bantz et al. |
| 2006/0149558 | A1 | 7/2006 | Kahn et al. |
| 2006/0167686 | A1 | 7/2006 | Kahn |
| 2006/0190249 | A1 | 8/2006 | Kahn et al. |
| 2007/0106508 | A1 | 5/2007 | Kahn et al. |
| 2007/0244700 | A1 | 10/2007 | Kahn et al. |
| 2007/0244702 | A1 | 10/2007 | Kahn et al. |
| 2008/0177536 | A1 | 7/2008 | Sherwani et al. |
| 2008/0255837 | A1 | 10/2008 | Kahn et al. |
| 2008/0262841 | A1* | 10/2008 | Miyamoto ....... G11B 20/00804 386/331 |
| 2009/0132660 | A1 | 5/2009 | Wyatt |
| 2011/0013756 | A1 | 1/2011 | Davies et al. |
| 2011/0069230 | A1 | 3/2011 | Polumbus et al. |
| 2011/0202270 | A1 | 8/2011 | Sharma et al. |
| 2011/0239107 | A1 | 9/2011 | Phillips et al. |
| 2011/0257972 | A1 | 10/2011 | Agevik |
| 2013/0060572 | A1 | 3/2013 | Garland et al. |
| 2013/0110565 | A1 | 5/2013 | Means et al. |
| 2013/0124984 | A1 | 5/2013 | Kuspa |
| 2013/0204618 | A1 | 8/2013 | Henry et al. |
| 2013/0231930 | A1* | 9/2013 | Sanso .................. G10L 21/00 704/235 |
| 2013/0295963 | A1 | 11/2013 | Sen |
| 2013/0322665 | A1 | 12/2013 | Bennett et al. |
| 2014/0035920 | A1 | 2/2014 | Duwenhorst |
| 2014/0201637 | A1* | 7/2014 | Na .................. H04N 21/440236 715/719 |
| 2014/0328575 | A1 | 11/2014 | Rodriguez et al. |
| 2015/0106091 | A1 | 4/2015 | Wetjen et al. |
| 2017/0004859 | A1 | 1/2017 | Charumilind |
| 2017/0018184 | A1 | 1/2017 | Northrup et al. |
| 2017/0169840 | A1* | 6/2017 | Rubin .................. G10L 15/26 |
| 2017/0330263 | A1 | 11/2017 | Shaffer |
| 2018/0053510 | A1 | 2/2018 | Kofman et al. |
| 2018/0270350 | A1 | 9/2018 | Engelke et al. |
| 2018/0358052 | A1 | 12/2018 | Miller et al. |
| 2019/0156816 | A1 | 5/2019 | Singh et al. |
| 2019/0268465 | A1 | 8/2019 | Broidy et al. |
| 2019/0312973 | A1 | 10/2019 | Engelke et al. |
| 2020/0302112 | A1* | 9/2020 | Helmbro .................. G10L 25/48 |
| 2020/0404097 | A1 | 12/2020 | Engelke et al. |
| 2021/0165973 | A1 | 6/2021 | Kofman et al. |

* cited by examiner

600

601 Receive media file uploaded by developer

602 Automatically create a transcript for the media file

603 Store media file and/or transcript as separate documents within a storage space 604 Enable the developer to edit the transcript and/or media file 605 Allow the developer to insert trigger points into the transcript and/or media file 606 Construct content-based experience using transcript and/or media file

FIG. 6

PLATFORM FOR PRODUCING AND DELIVERING MEDIA CONTENT

CROSS-REFERENCE TO RELATED APPLICATIONS

This application is a continuation application of U.S. patent application Ser. No. 16/600,095, titled "Platform for Producing and Deliver Media Content" and filed Oct. 11, 2019, now U.S. Pat. No. 11,262,970, which is a continuation application of U.S. patent application Ser. No. 15/716,957, titled "Platform for Producing and Deliver Media Content" and filed on Sep. 27, 2017, now U.S. Pat. No. 10,445,052, which claims priority to U.S. Provisional Patent Application No. 62/404,142, titled "Platform for Producing and Delivering Media Content" and filed on Oct. 4, 2016, each of which is incorporated by reference herein in its entirety.

FIELD OF THE INVENTION

At least one embodiment of the present disclosure pertains to media editing tools and, more particularly, to software programs for producing media content and delivering media content to consumers.

BACKGROUND

A digital audio workstation (DAW) is an electronic device or a software program for recording and producing audio files, such as songs, speech, and sound effects. DAWs come in a wide variety of configurations, from a software program executing on a personal computer to a highly complex configuration of numerous components (e.g., recording devices, such as microphones, and editing devices, such as personal computers) controlled by a central computing device.

Conventionally, a DAW consists of a mixing console, control surface, audio converter, and data storage in a single computing device. These hardware-implemented DAWs were more popular before commonly available personal computers became powerful enough to run the necessary audio editing software.

Nowadays, "DAW" may simply refer to the audio editing software itself. The computing device responsible for executing the audio editing software typically includes either a sound card or audio interface, as well as at least one input device for modifying data. Examples of input devices include a mouse, a piano-style MIDI controller keyboard, an automated fader board for mixing track volumes, etc. The computing device acts as a host for the sound card/audio interface, and the software provides the interface and functionality for audio editing. While these computer-based DAWs have extensive recording, editing, and playback capabilities, they are often designed for use by audio experts.

BRIEF DESCRIPTION OF THE DRAWINGS

Various features of the technology will become more apparent to those skilled in the art from a study of the Detailed Description in conjunction with the drawings. Embodiments of the technology are illustrated by way of example and not limitation in the drawings, in which like references may indicate similar elements.

FIG. 6 depicts a flow diagram of a process for producing media content and content-based experiences.

Figure 1:
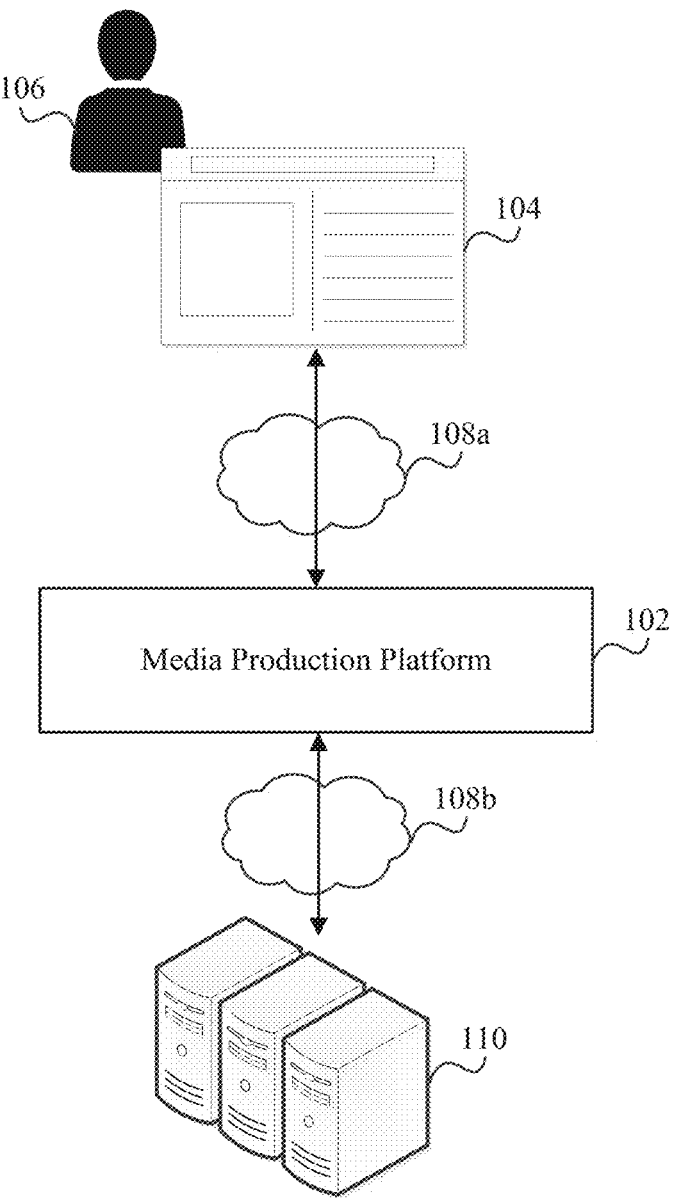
FIG. 1 illustrates a network environment that includes a media production platform responsible for creating graphical user interfaces (GUIs) through which end users can produce media content.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Introduced here are software-implemented tools for recording and/or producing (e.g., creating and editing) media content. These tools can be used to simultaneously or sequentially edit audio, video, and/or text. Accordingly, the tools may be used by radio producers, podcast producers, television producers, etc.

More specifically, various embodiments pertain to software programs for recording and/or producing media content. A software program may be supported by a media production platform, which may generate the graphical user interfaces (GUIs) through which end users can create, edit, etc., various types of media content. For example, the software program may be embodied as a word processor that allows an end user to edit voice-based audio by editing text, and vice versa. As another example, the software program may facilitate the creation of location-based media content (also referred to as "geo-based media content") by enabling an end user to readily insert geographical trigger points directly within the media content (e.g., within a text-based script).

Several of the GUIs described herein also allow different media formats (e.g., audio and text) to be aligned for post-processing. Said another way, the media production platform could dynamically link multiple media files to one another, which allows edits to be more easily carried throughout all of the media files. For example, when an end user modifies a transcript corresponding to an audio file (e.g., by copying and pasting a transcript segment to a different location), the media production platform may cause the change to be reflected globally. Thus, the media production platform may cause similar or identical modifications to be made to the corresponding audio file. User feedback could also be posted to a GUI so that appropriate modifications can be made based on actual user experiences.

Media production software generally falls under two categories, desktop software programs and web-based software programs (also referred to as "software-as-a-service" or "SaaS"). Accordingly, the GUIs described herein may be accessible via a web browser, desktop software program, mobile application, and/or over-the-top (OTT) application. For example, in some embodiments the GUIs are entirely browser-based (i.e., execution is performed/facilitated by a remote computing device rather than the local computing device used to access the web browser).

Generally, the media production software is designed for execution by a specific operating system, such as Microsoft Windows®, Apple macOS®, Apple iOS, Linux® (and its variants), Google Android®, etc. While certain embodiments may be described in the context of a certain type of software program, those skilled in the art will recognize that the features are equally applicable to other software program types.

Different system architectures could be used to build the media production platform. The media production platform may be executed by a cloud computing service operated by, for example, Amazon Web Services® (AWS) or a similar technology. Moreover, the media production platform could reside on a single instance of AWS, though different interfaces or projects may be supported different containers using different Internet Protocol (IP) addresses for network access.

Often, a host server is responsible for supporting the media production platform. The host server may be communicatively coupled to one or more content servers that include media content and other assets. Note, however, that the media production platform could also be designed so that it can function without a host server.

Terminology

References in the present disclosure to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and comprising" are to be construed in an inclusive sense rather than an exclusive or exhaustive sense (i.e., in the sense of "including but not limited to"). The terms "connected," "coupled," or any variant thereof is intended to include any connection or coupling, either direct or indirect, between two or more elements. The coupling/connection can be physical, logical, or a combination thereof. For example, two devices may be electrically and/or communicatively coupled to one another.

When used in reference to a list of multiple items, the word "or" is intended to cover all of the following interpretations: any of the items in the list, all of the items in the list, and any combination of items in the list. Meanwhile, if the present disclosure states that a feature "may," "can," "could," or "might" be included or have a characteristic, that particular feature is not required and need not necessarily have the characteristic.

The term "module" refers broadly to software, hardware, and/or firmware components. Modules are typically functional components that generate useful data and/or other output(s) based on specified input(s). A software program may include one or more modules, or a module may include one or more software programs.

System Topology Overview

FIG. 1 illustrates a network environment 100 that includes a media production platform 102 responsible for creating graphical user interfaces (GUIs) through which end users can produce (e.g., create and edit) media content. Examples of media content include audio-based content (e.g., radio segments and podcasts) and video-based content (e.g., television programs and presentations). Here, an end user 106 (also referred to as a "developer") can interface with the media production platform 102 via a network-accessible interface 104. The end user 106 may be, for example, an individual interested in recording media content (e.g., music), editing media content (e.g., a podcast or an audio tour), etc.

The media production platform 102 may reside in a network environment 100. Thus, the media production platform 102 may be connected to one or more computer networks 108a-b, which may include local area networks (LANs), wide area networks (WANs), metropolitan area networks (MANs), cellular networks, the Internet, etc. Other wired communication channels or wireless communication channels could also be used. For example, in some embodiments the computing device on which the end user 106 accesses the network-accessible interface is communicatively coupled to a microphone, an instrument, a piano-style MIDI controller keyboard, an automated fader board for mixing track volumes, etc.

As further described below, the media production platform 102 can facilitate transcript-driven media production. The end user 106 may be able to alter an audio file by modifying a corresponding transcript viewable through the network-accessible interface 104. For example, the end user 106 could insert audio files (e.g., music clips and sound effects) directly within the transcript.

The media production platform 102 may also be able to automatically modify media content on behalf of the end user 106. In fact, the media production platform 102 could create/modify a timeline associated with a content-based experience (e.g., an audio tour, audiobook, video segment, or video game) based on the implicit actions and/or explicit actions of the individual participating in the experience (also referred to as a "consumer" of the media content). For example, the media production platform 102 may intelligently add, remove, and/or modify media content within a guided audio tour as the individual progresses through the guided audio tour.

Media content could reside on the computing device used to access the network-accessible interface 104, on a content server 110 accessible to the media production platform 102, etc. Thus, media content could be hosted locally and/or remotely.

The network-accessible interface 104 may enable multiple end users to simultaneously or sequentially edit the same media content. For example, when multiple end users simultaneously access the network-accessible interface 104, the media production platform 102 may ensure that changes made by a given end user are posted to each instance of the network-accessible interface 104 in near real time. While certain embodiments are described in the context of network-accessible interfaces, those skilled in the art will recognize that the interfaces need not necessarily be accessible via a network. For example, a computing device associated with the end user 106 may be configured to execute a self-contained software program (e.g., a desktop software program) that does not require network access. Instead, the self-contained software program may cause all necessary assets (e.g., instruction sets and media content) to be downloaded at a single point in time or on a periodic basis (e.g., daily or weekly).

Figure 2:
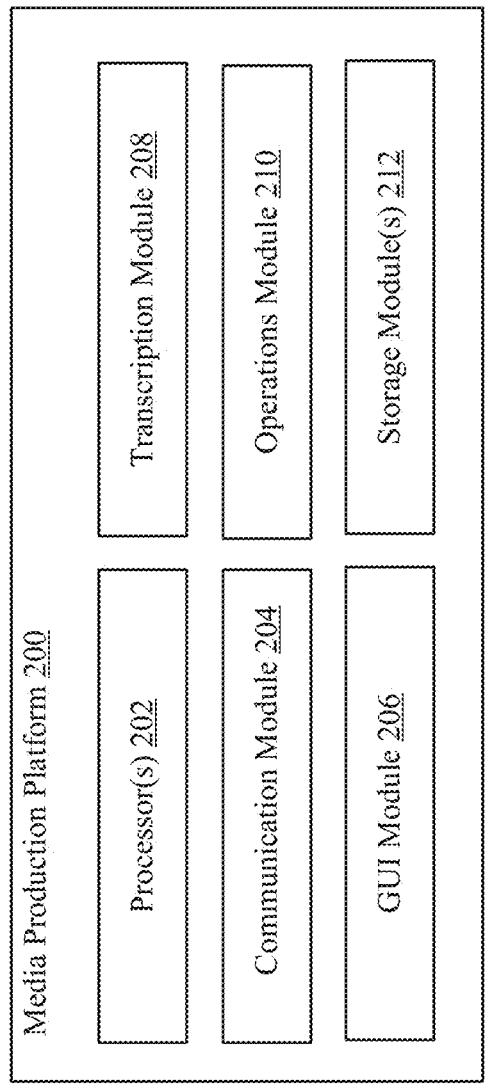
FIG. 2 depicts the high-level architecture of a media production platform for recording, producing, and/or delivering media content.

FIG. 2 depicts the high-level architecture of a media production platform 200 for recording, producing, and/or delivering media content. The media production platform 200 can include one or more processors 202, a communication module 204, a GUI module 206, a transcription module 208, an operations module 210, and one or more storage modules 212. Embodiments of the media production platform 200 may include some or all of these modules/components, as well as other modules/components not shown here.

The processor(s) 202 can execute modules (e.g., the transcription module 208 and the operations module 210) from instructions stored in the storage module(s) 212, which can be any device or mechanism capable of storing information. In some embodiments a single storage module includes multiple computer programs for performing different processing operations (e.g., optical character recognition, audio transcription, or language recognition), while in other embodiments each computer program is hosted within a separate storage module.

The communication module 204 can manage communications between various components of the media production platform 200 and/or between the media production platform 200 and another computing device. For example, in some embodiments the media production platform 200 resides on a computing device associated with an individual and the communication module 204 communicates with a remote server system across a network. In other embodiments, the media production platform 200 resides on the remote server system and the communication module 204 communicates with a software program executing on the computing device associated with the individual. The remote server system can include one or more network-connected computing devices (e.g., servers).

Those skilled in the art will recognize that the modules/components of the media production platform 200 can be distributed between the remote server system and the computing device associated with the individual in various manners. For example, some data (e.g., media content) may reside on the computing device of the individual, while other data (e.g., processing algorithms) may reside on the remote server system.

The GUI module 206 can generate network-accessible interfaces (e.g., the network-accessible interface 104 of FIG. 1) that allow an end user to interact with the media production platform 200. The network-accessible interfaces may be presented by a web browser, desktop software program, mobile application, or over-the-top (OTT) application. Accordingly, the network-accessible interfaces may be viewed on a personal computer, tablet computer, personal digital assistant (PDAs), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality system (e.g., a head-mounted display such as Oculus Rift® and Microsoft Hololens®), or some other electronic device.

Various system architectures could be used to build the media production platform 200. For example, the media production platform 200 may be executed by a cloud computing service operated by Amazon Web Services® (AWS) or a similar technology. Moreover, the media production platform 200 could reside on a single instance of AWS, though different interfaces or projects may be supported different containers using different Internet Protocol (IP) addresses for network access. Often, a host server is responsible for supporting the media production platform 200. The host server may be communicatively coupled to one or more content servers (e.g., the content servers 110 of FIG. 1) that include media content associated with different experiences, end user information (e.g., user profiles, login credentials, registration details), and other assets.

FIGS. 3A-F include various interfaces that enable an end user to readily produce high quality media content. The interfaces, which are created by a media production platform, may enable nearly anyone who knows how to use a word processor to produce media content.

Moreover, the media production platform can support powerful features that can be used to create media content, incorporate consumer feedback, and ensure the interface(s) are straightforward and easy to use. Examples of media content include location-based audio/video experiences, podcasts, audiobooks, radio/television segments, etc. These powerful features are enabled by higher level content-based editing tools, rather than the lower level waveform-based editing tools used by conventional digital audio workstations (DAWs). In fact, the media production platform can facilitate collaboration between multiple end users simultaneously (as well as multiple consumers who experience content simultaneously).

Figure 3A:
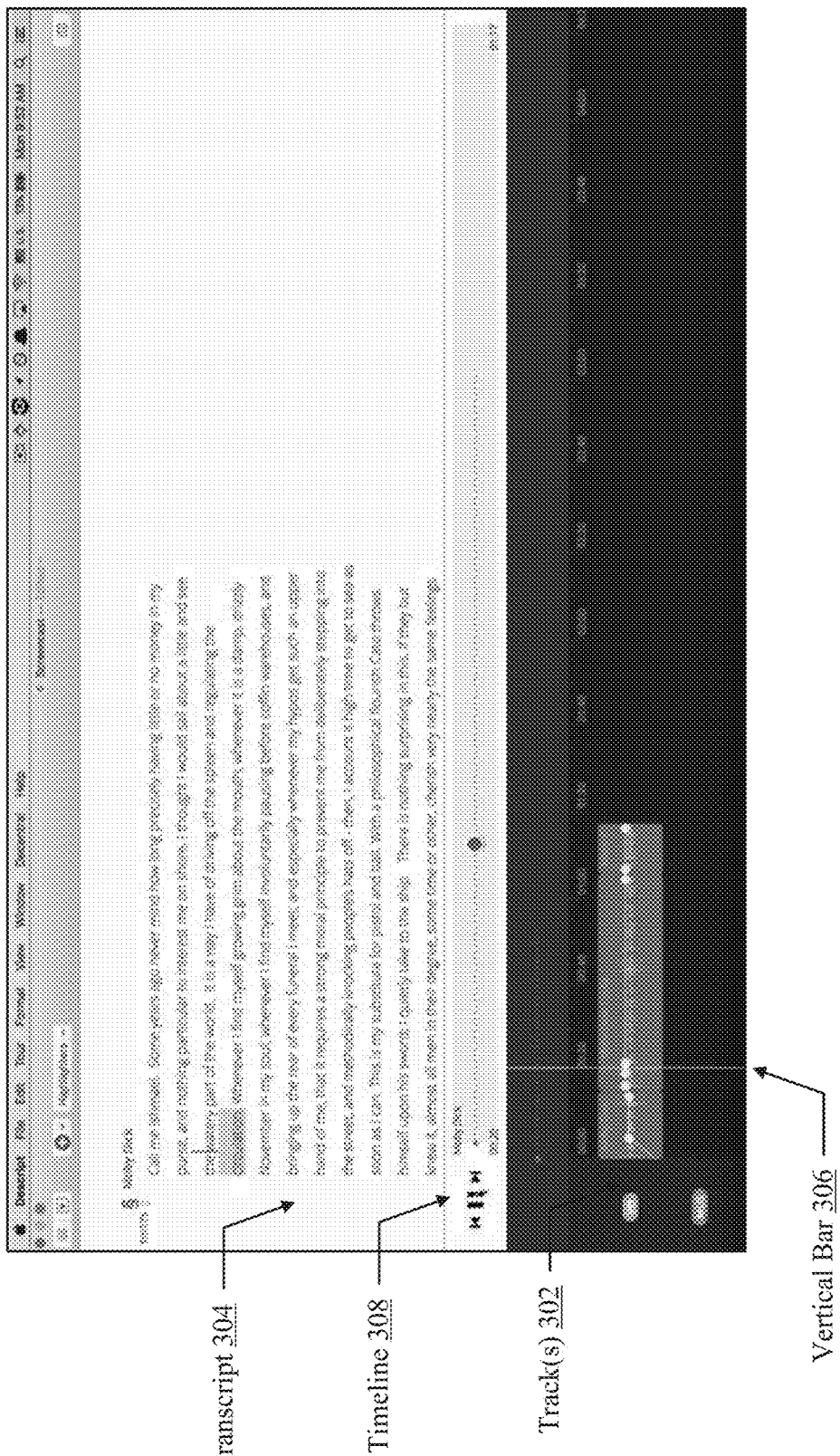
FIG. 3A depicts an interface that includes multiple windows for producing media content.

As shown in FIG. 3A, an interface may include multiple windows for producing media content. Production may involve creating and/or editing media content. For example, one or more tracks 302 corresponding to audio file(s) could be presented in one window, while a transcript 304 of words recognized within the audio file(s) could be presented in another window. The track(s) 302 may be separately or collectively editable.

Moreover, the media production platform may be able to intelligently switch between multiple tracks based on whether certain criteria are satisfied, much like a video game engine. For example, the media production platform may determine whether certain condition(s) are met for playing a particular audio file. As another example, the media production platform may determine whether an end user has begun editing a portion of the transcript corresponding to a particular audio file.

Interfaces having multiple windows can easily align media content for post-processing and editing. Alignment can also be permitted between media content of different formats (e.g., audio and text). For example, when an end user modifies a transcript (e.g., by copying a transcript segment and pasting it to a different location), the media production platform may cause the change to reflected globally. That is, the media production platform may effect an identical or similar modification to an audio file associated with the transcript. Such action may be performed periodically or continually. For example, the media production platform may continually monitor for changes so long as the available bandwidth or connectivity status meets a specified threshold. Should these measure(s) fall below the specified threshold, the media production platform may periodically query the computing device regarding any modification(s) made to the audio file or transcript.

In some embodiments, visual indicators are used to indicate current position within the transcript 304 and/or the track(s) 302. Here, for example, the media production platform has highlighted the current word within the transcript and created a vertical bar 306 that overlays the track(s) 302. Other visual mechanisms could also be used. A timeline 308 may indicate the total duration of the media content, as well as provide a visual representation of progress.

Figure 3B:
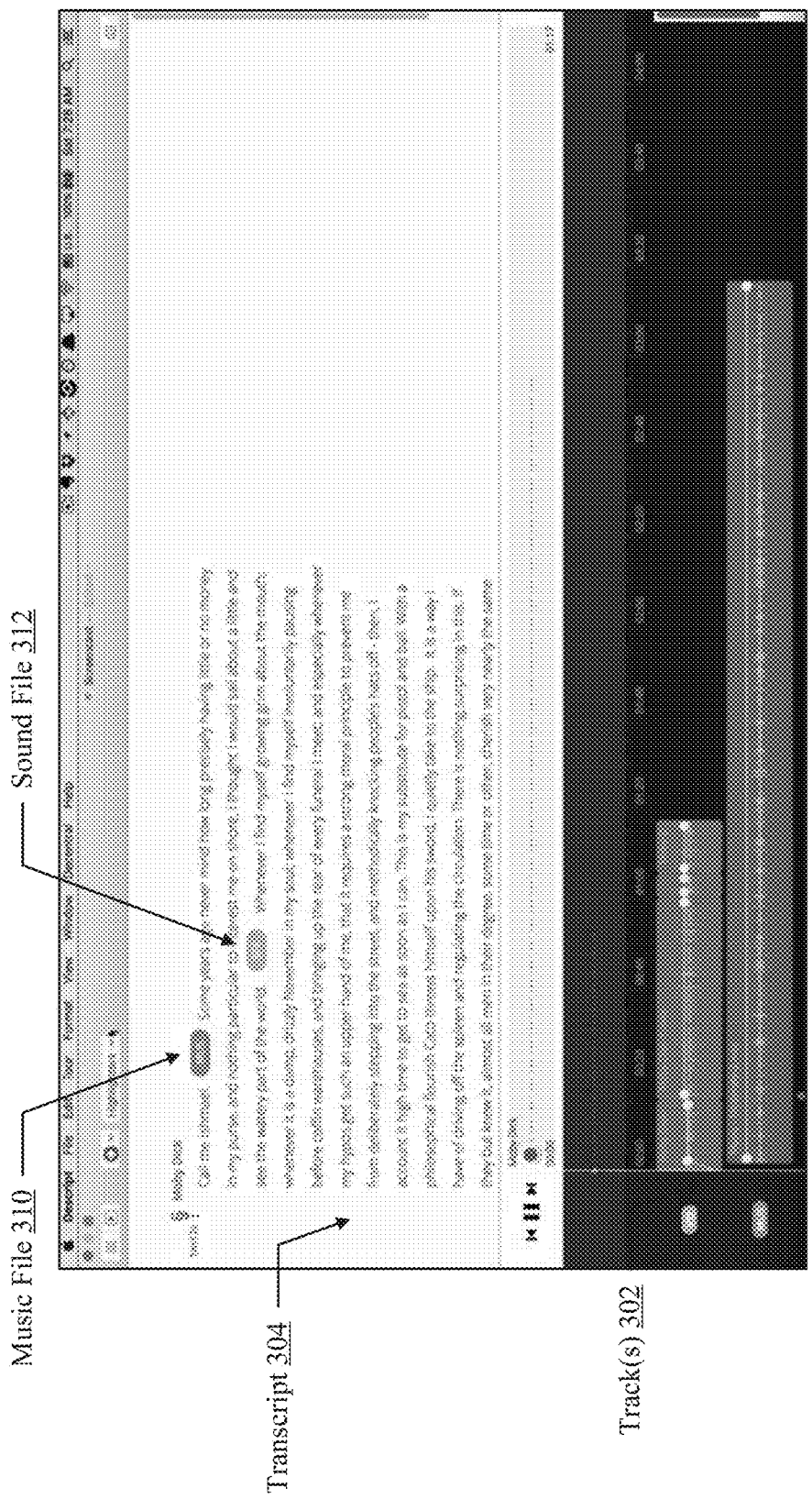
FIG. 3B depicts an interface that may facilitate in-line multi-track sequencing of the content within windows shown on the interface.

As shown in FIG. 3B, an interface may also facilitate in-line multi-track sequencing of the content within windows shown on the interface. In some embodiments all of the windows on the interface are dynamically linked together, while in other embodiments only some of the windows on the interface are dynamically linked together. Audio files can be selected and placed (e.g., via a drag-and-drop mechanism) directly where an end user would like the sound to play. Here, for example, a music file 310 and a sound file 312 have been placed within the transcript 304 by the end user.

Once an audio file has been placed within the transcript 304, a waveform corresponding to the audio file may be automatically placed along one of the track(s) 302 in the waveform window. When the audio file is moved by the end user within the transcript 304, the media production platform can ensure that the corresponding waveform moves along the track as well. As noted above, the transcript 304 and the audio file(s) arranged along the track(s) 302 are typically synced to one another so that changes made to one can be propagated across the other by the media production platform in near real time.

The end user may also be able to separately edit the audio file(s) arranged along the track(s) 302 from within the waveform window. For example, the end user may be able to modify the duration of an audio file (e.g., by cutting material from the beginning or end), set fades, and perform other operations without leaving the interface.

Figure 3C:
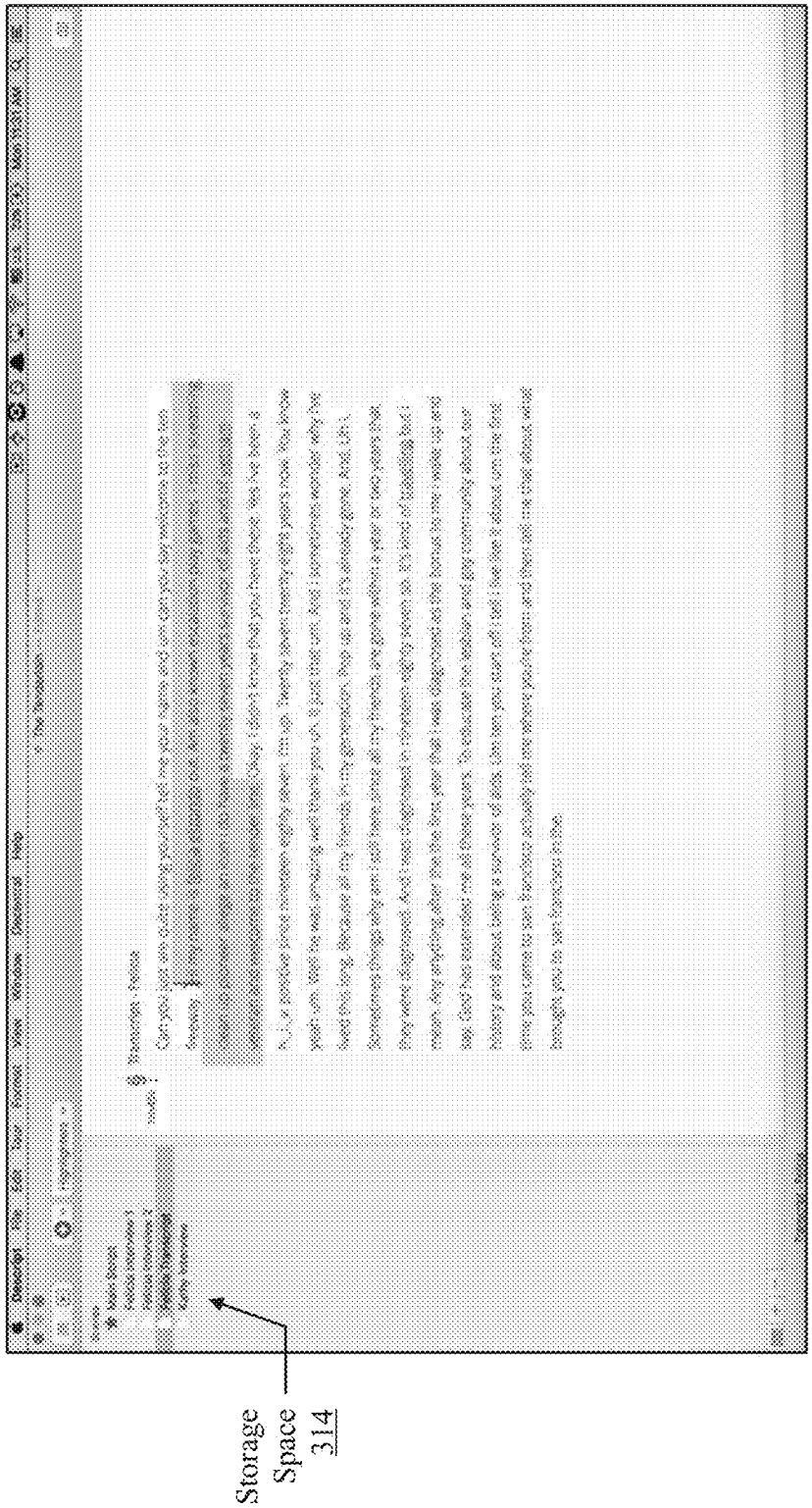
FIG. 3C shows how files can be stored as separate documents within a storage space.

As shown in FIG. 3C, files can be stored as separate documents within a storage space 314. Examples of files include text files (e.g., transcripts), audio files (e.g., voiceover recordings), and video files. In some embodiments, the storage space 314 is associated with a particular project/experience. Accordingly, only those files related to the particular project/experience may be shown within the storage space 314. Here, for example, four separate files (i.e., Felicia Interview 1, Felicia Interview 2, Felicia Transcript, and Kathy Interview) are associated with a single project (i.e., a guided audio tour of the Tenderloin neighborhood of San Francisco). The four separate files include three audio files (i.e., Felicia Interview 1, Felicia Interview 2, and Kathy Interview) and one text file (i.e., Felicia Transcript).

An end user could manually associate an audio file with a preexisting transcript when the audio file is uploaded to the media production platform. Additionally or alternatively, the media production platform may automatically generate a transcript responsive to receiving the audio file and post the transcript to the interface for review by the end user. For example, the media production platform may create a transcript upon determining that a transcript does not already exist. If a transcript is uploaded to the media production platform (or written using the interface) and no corresponding audio file(s) exist, the media production platform may automatically generate voice-like scratch audio that can be used to test certain aspects of a project, such as expected runtime, flow, etc.

Figure 3D:
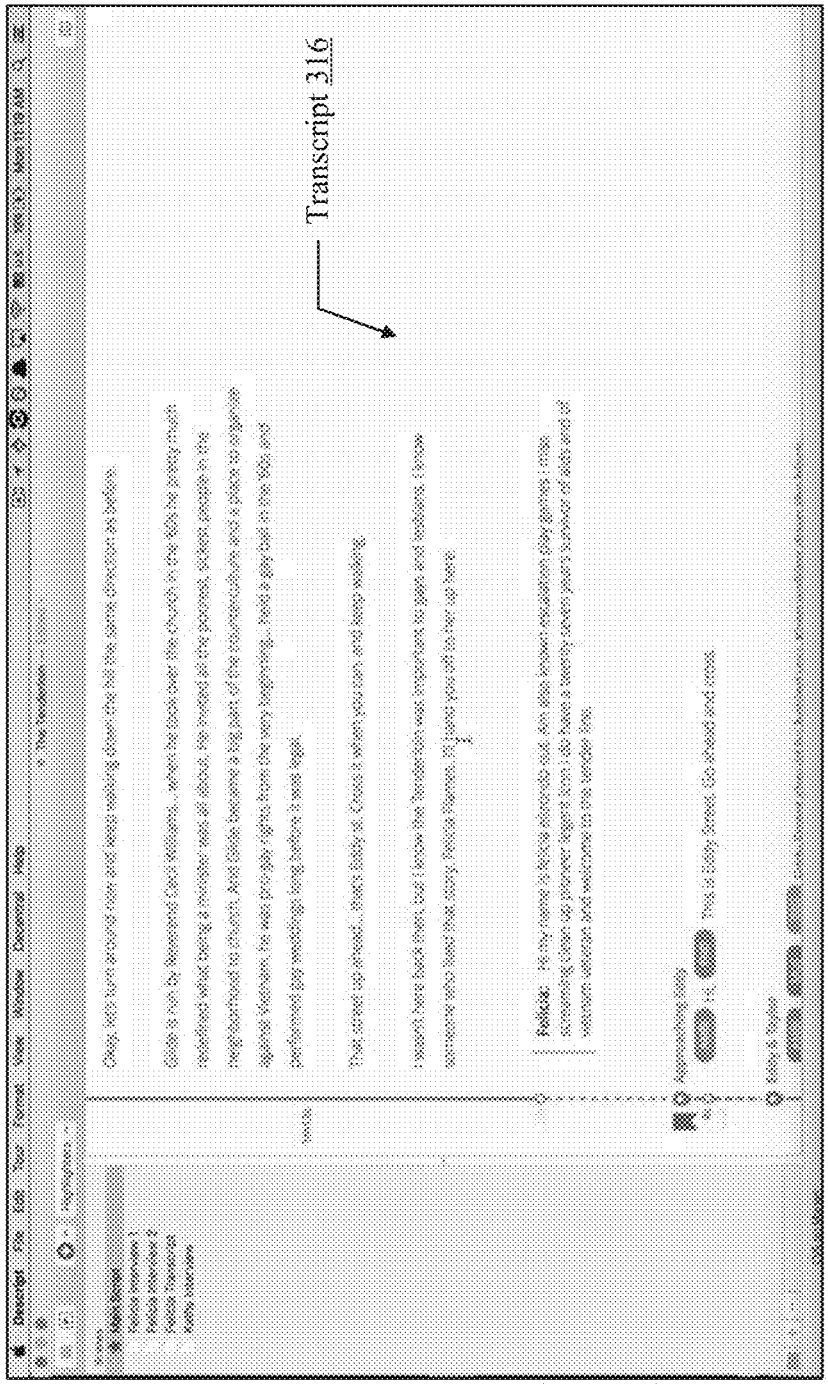
FIG. 3D shows how an end user can select a transcript segment (e.g., by selecting a portion of a transcript or a corresponding audio waveform).
Figure 3E:
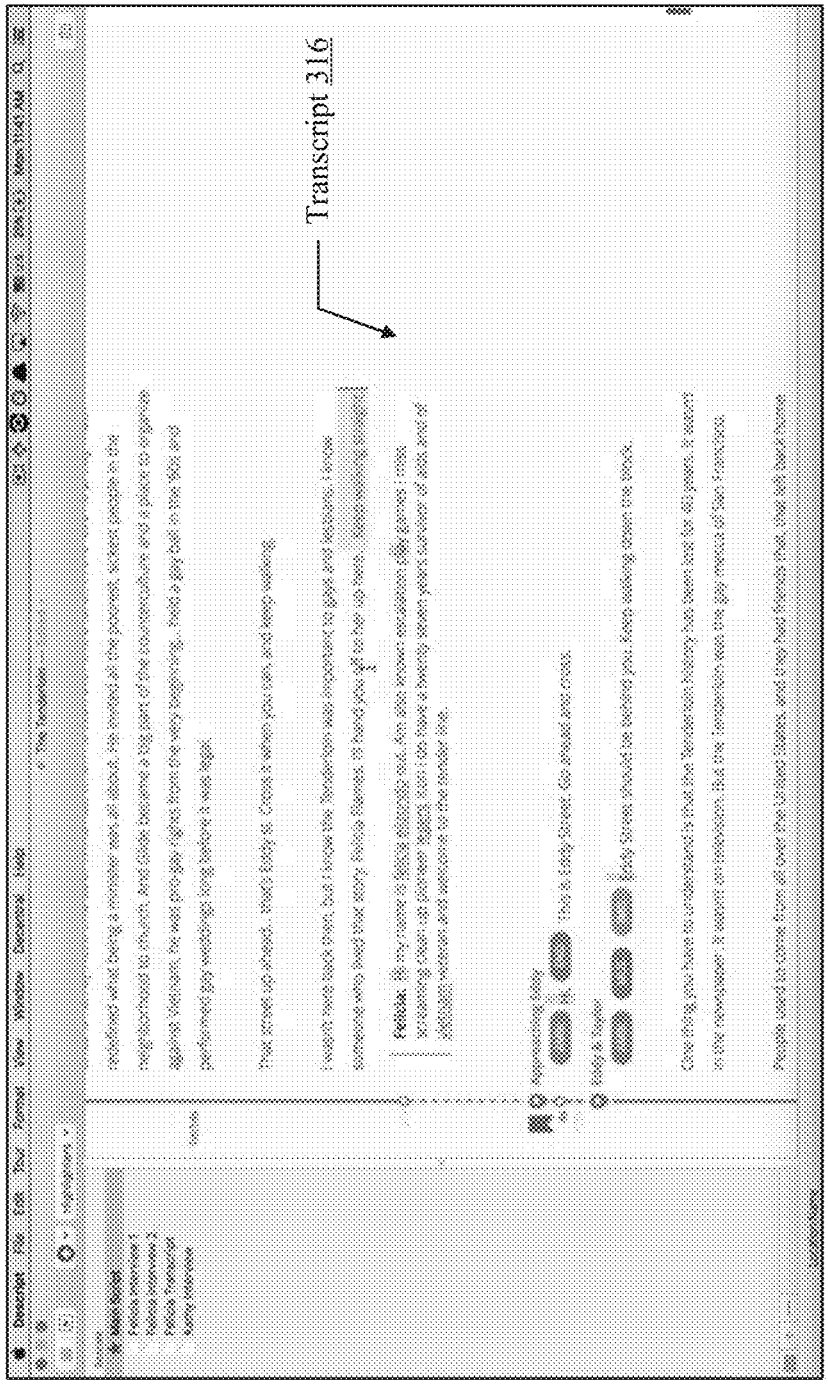
FIG. 3E shows how the end user can copy the transcript segment and paste the transcript segment into another transcript, another location within the transcript, etc.

Each file accessible to the media production platform may be independently editable using the interface(s) shown here. However, an end user may also be able to easily switch between various files while producing a project. As shown in FIGS. 3D-E, the end user could select a transcript segment (e.g., by selecting a portion of a transcript 316 or a corresponding audio waveform), copy the transcript segment, and then paste the transcript segment into another transcript, another location within the transcript 316, etc.

Any corresponding media contact may also be transferred based on the single action performed by the end user. For example, the selection of a transcript segment may prompt the media production platform to create an audio segment by cutting a source audio segment. Accordingly, if the end user copies segments of a first transcript and pastes the segments into a second transcript, segments from a first audio waveform corresponding to the first transcript can be used to form a second audio waveform associated with the second transcript.

Such granular modification of the text/audio is enabled by precisely aligning the transcript and corresponding audio file. Alignment may occur during pre-processing audio files, generating of the transcript, etc. When an audio file is provided to the media production platform (e.g., via an upload through the interface), various speech recognition processes can be performed that enable language spoken within the audio file to be converted into text.

Accordingly, the media production platform may be able to automatically align audio file(s) uploaded by an end user with a preexisting transcript by detecting certain words, phrases, etc. In fact, the media production platform could automatically stack multiple utterances of the same phrase upon detecting a single occurrence of the phrase within the transcript. That is, an individual may be able to record over a preexisting script. Such events are often indicative of multiple takes of the same line of dialogue by a voice actor. Accordingly, an end user may be able to initiate playback the multiple takes, select a particular take, etc.

The media production platform can create a transcript using the recognized text. Moreover, the media production platform can parse the recognized text and align the text with the corresponding portion of the audio file on a phoneme level or word level. Consequently, audio waveforms can be readily modified by the media production platform based on changes to the transcript, and vice versa. Note, however, that even if the transcript is not identical to the audio waveform (e.g., the transcript includes one or more errors), alignment can still be performed to determine a best fit for the audio waveform within the transcript based on context.

As shown in FIG. 3E, end users may also be able to modify the transcript 316 directly. Here, an end user has added text ("Keep walking straight.") directly into the transcript 316. In some embodiments, modifications are visually highlighted in some manner. For example, newly-added text may be highlighted in a particular color to indicate that audio must still be recorded for that text. In such instances, if the end user elects to play the transcript (e.g., for testing purposes), an intelligent computer program may read the newly-added text so as to not interrupt the flow of the content-based experience. Examples of modifications include additions of new text, removals of existing text, and changes to existing text.

Figure 3F:
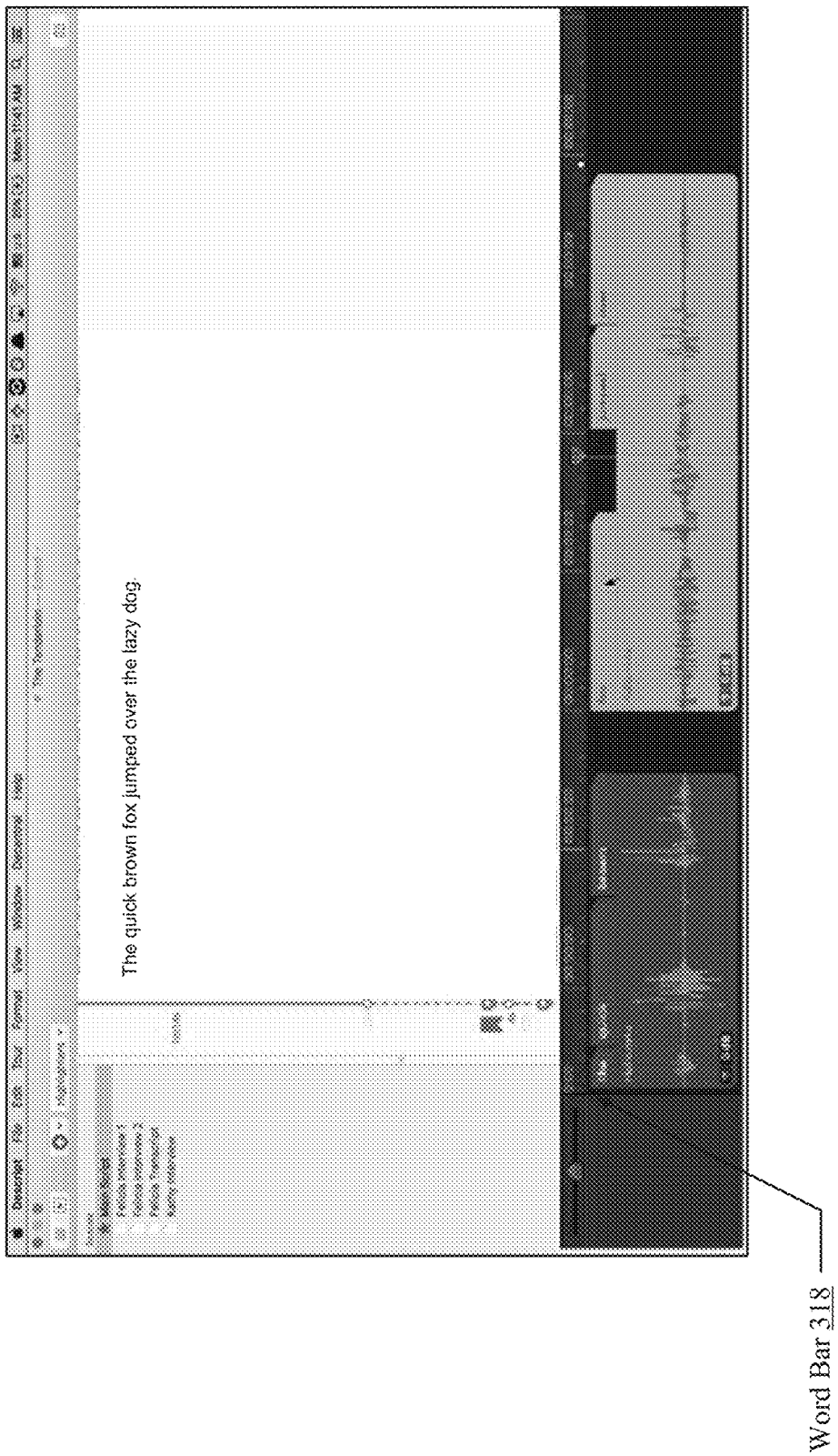
FIG. 3F depicts an interface that includes a word bar, which allows the end user to directly manipulate words from a waveform editor window.

As shown in FIG. 3F, some interfaces include a word bar 318 that visually represents the individual words in an audio waveform. The media production platform may automatically populate the word bar 318 after parsing the audio waveform to recognize the word(s). End users may be able to directly manipulate the audio waveform by manipulating the word(s), eliminate gaps in the audio waveform, create gaps in the audio waveform, etc.

Figure 3G:
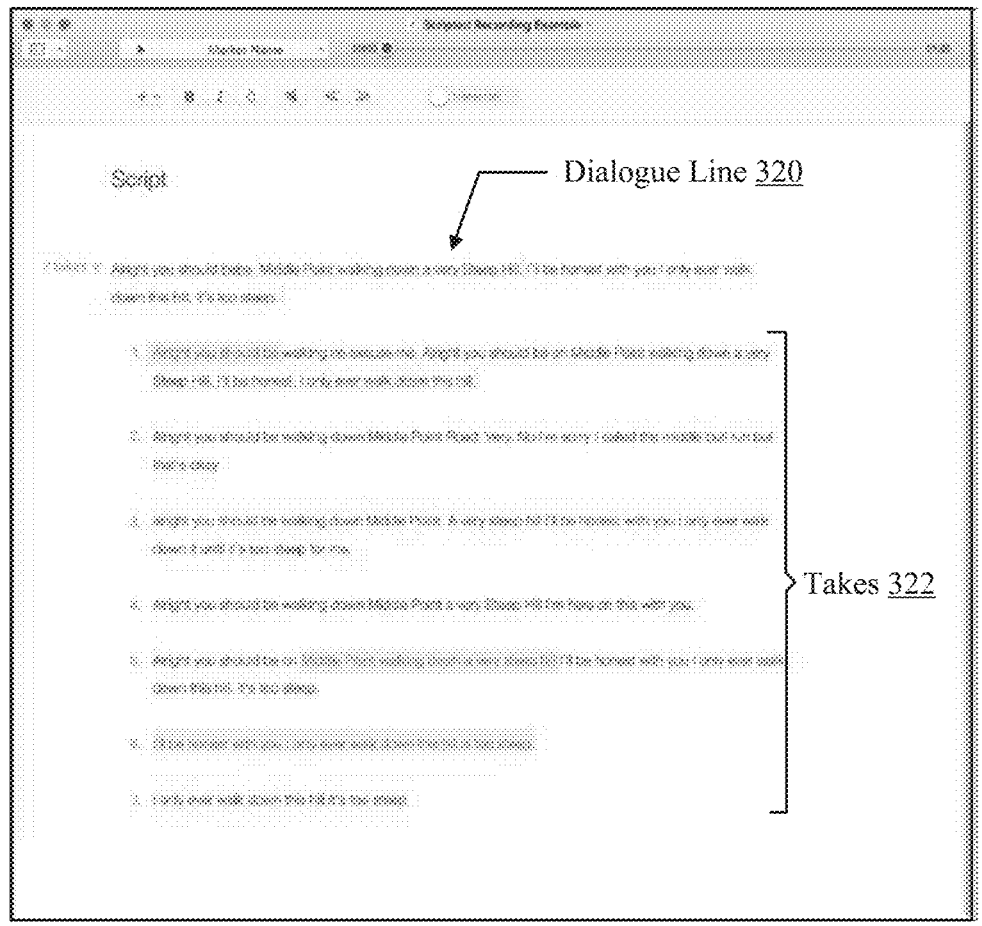
FIG. 3G illustrates how multiple voices that are simultaneously speaking within an audio/video recording may be separately shown using script section blocks.

As shown in FIG. 3G, multiple voices that are simultaneously speaking within an audio/video recording may be separately shown using script section blocks. Such a scenario is often referred to as "crosstalk."

Multiple takes of the same line of dialogue may be displayed in a similar manner. Here, for example, there are seven different takes 322 of a line of dialogue 320. These takes 322 are contemporaneous in nature. That is, all of the takes occur at the same point in time during a content-based experience. Accordingly, a consumer is only likely to experience a single take. However, end users (e.g., developers) may want to see how the different takes affect flow, runtime, etc.

Playhead(s) may be used to represent the position of the media content currently being access. For example, in some embodiments multiple playheads are used for those takes that share words, phrases, etc., in common. While playheads are often illustrated as vertical graphic lines within the text, other visual indicators may be used. For example, words may be individually highlighted as they are presented during playback of a take by the media production platform.

Figure 4A:
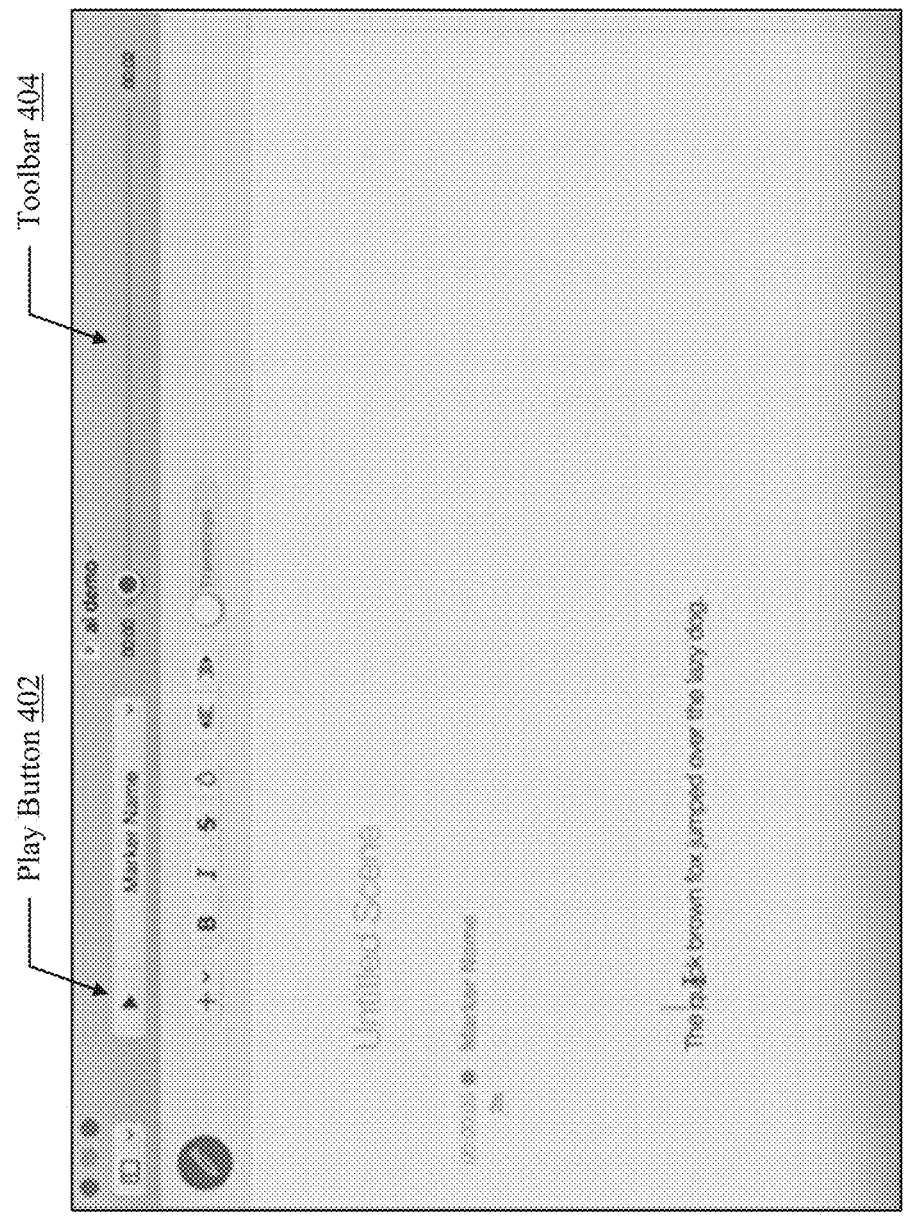
FIG. 4A depicts an audio file transcript created by a media production platform on behalf of an end user.

FIGS. 4A-D illustrate several artificial intelligence-driven (AI-driven) audio editing features that may be enabled by a media production platform. FIG. 4A, for example, illustrates a transcript of an audio file created using the techniques described above. An end user may be able to easily initiate playback of the audio by selecting a play button 402 accessible on a toolbar 404.

Figure 4B:
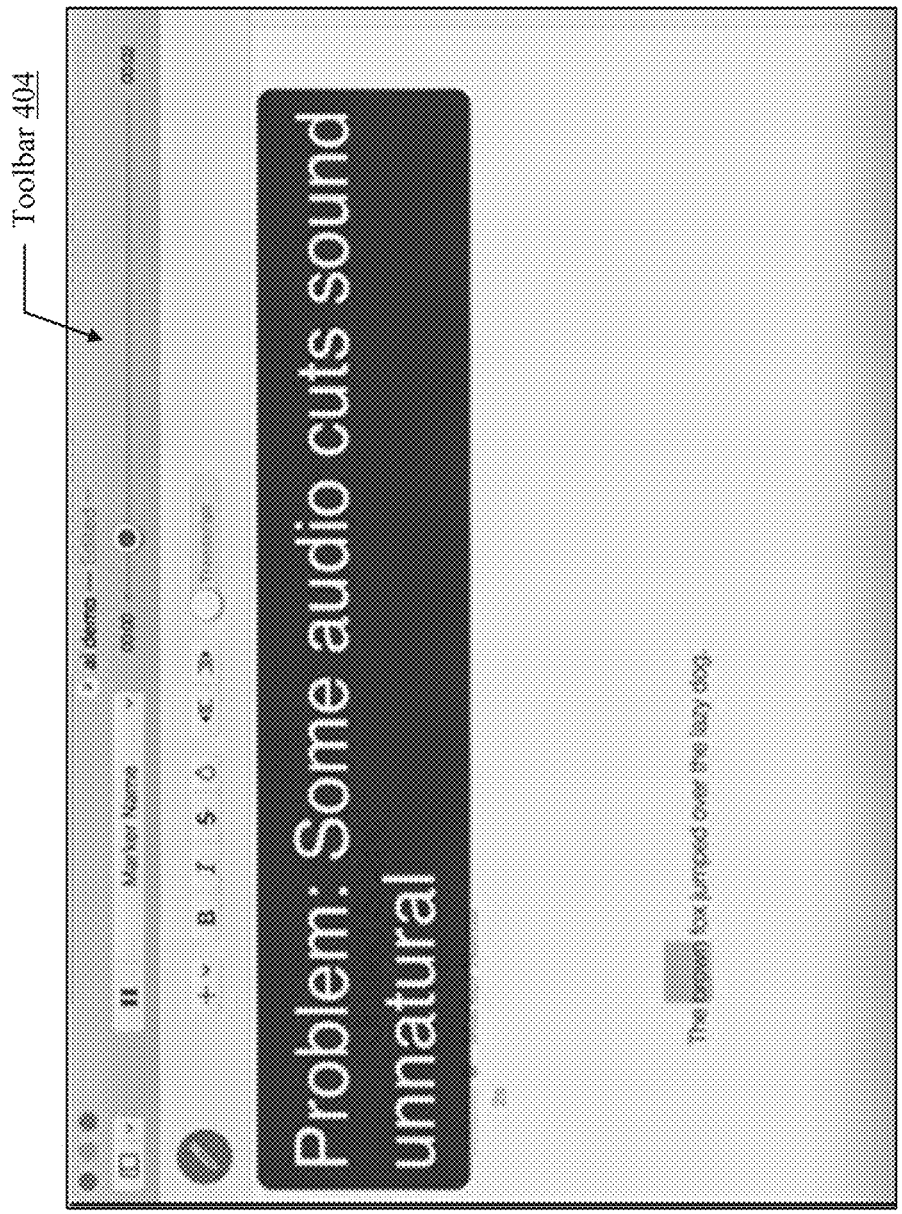
FIG. 4B depicts the audio file transcript after the end user has deleted the word "quick."

In some instances, the end user may wish to cut an audio segment from the audio file. FIG. 4B illustrates the transcript of the audio file after the end user has deleted the word "quick." Because the media production platform can align the transcript with the corresponding audio file on a phoneme level or word level, the media production platform can readily delete the audio corresponding to the word "quick." However, such audio cuts often sound unnatural due to normal intonation while speaking.

Figure 4C:
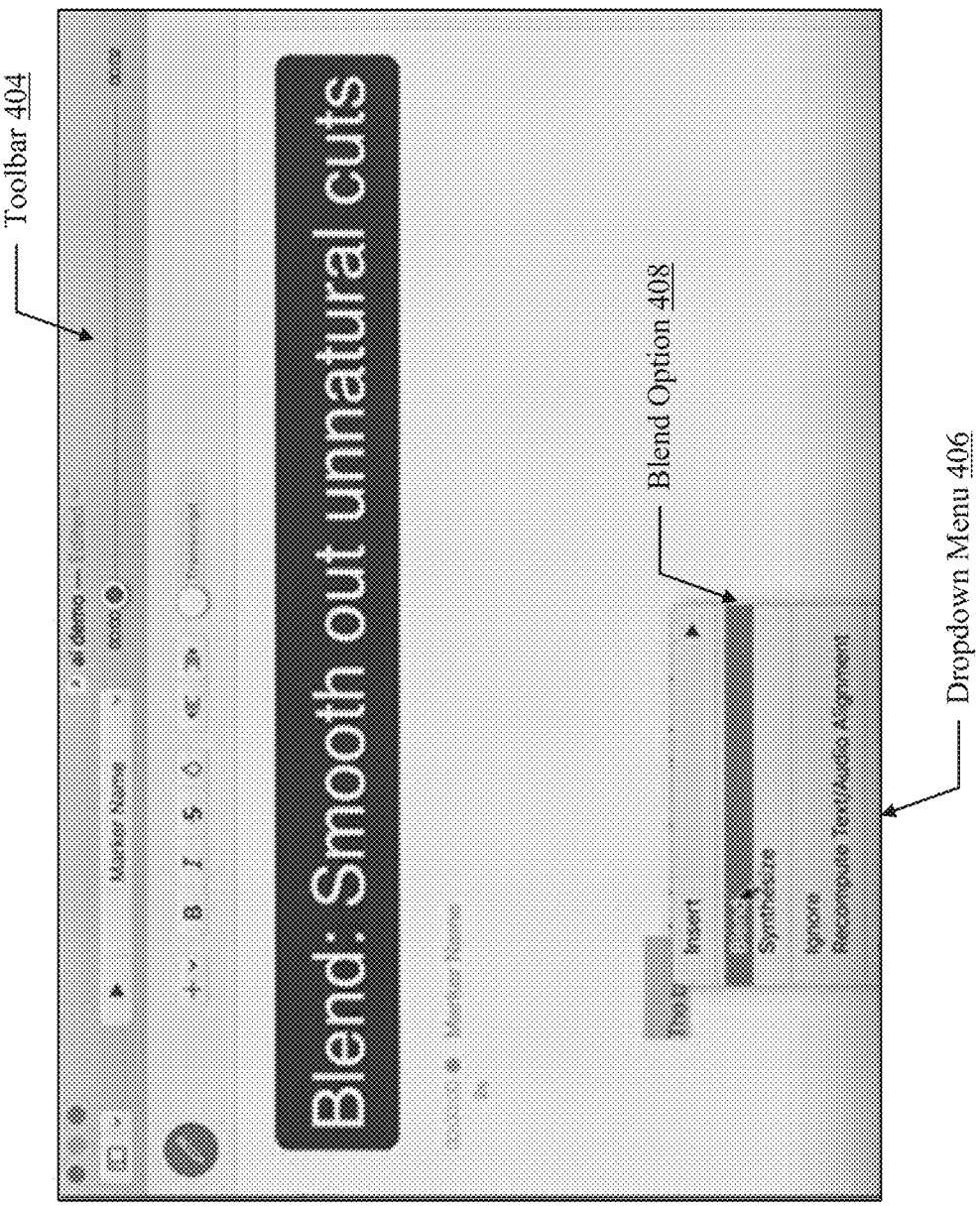
FIG. 4C shows how the end user may select the words that originally surrounded the word "quick" (here, "the" and "brown"), and then choose a blend option available on a dropdown menu.

Some embodiments of the media production platform enable the end user to smooth these unnatural cuts by performing a blending operation. FIG. 4C, for example, shows how the end user may select the words that originally surrounded the word "quick" (here, "the" and "brown"), and then choose the blend option 408 available on a dropdown menu 406. Additionally or alternatively, the blend option 408 could be presented on the toolbar 404, associated with a hotkey, etc.

Responsive to receiving user input indicative of a selection of the blend option 408, the media production platform can perform AI-driven operations to improve the transition between these words. The AI-driven operations may prompt changes in volume, tone, speed, etc.

Figure 4D:
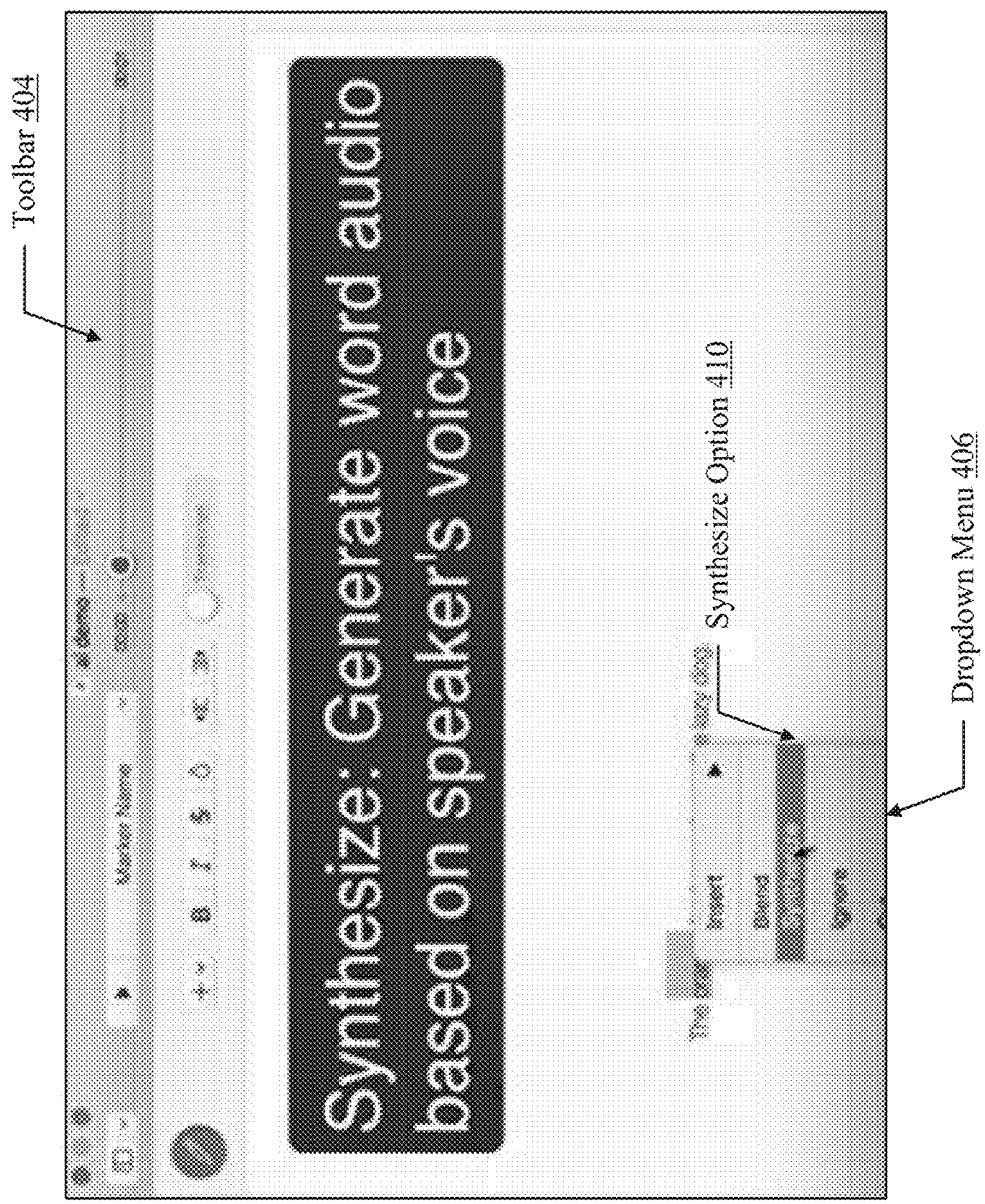
FIG. 4D shows how the end user may select the newly-added word, and then choose a synthesize option available on the dropdown menu.

In some instances, the end user may want to add words into the transcript. Here, for example, the end user has deleted "brown" and replaced it with "orange." FIG. 4D shows how the end user may select the newly-added word, and then choose the synthesize option 410 available on the dropdown menu 406. Additionally or alternatively, the synthesize option 410 could be presented on the toolbar 404, associated with a hotkey, etc.

Responsive to receiving user input indicative of a selection of the synthesize option 410, the media production platform can perform AI-driven operations to generate an audio sample based on the speaker's voice. While the word "orange" is not included in the original audio file, the media production platform can intelligently create a new audio sample based on, for example, how the speaker pronounces the alphabetic characters in other words.

Several interfaces described herein may also enable end users to easily align media content (e.g., audio files or text files) with trigger points that cause specific media content to be invoked by the media production platform or a software program through which a consumer participates in content-based experiences. Trigger points could include Global Positioning System (GPS) coordinates, wireless access point (WAP) identifiers (e.g., a Wi-Fi router identifier), verbal utterances, physical interactions with a computing device (e.g., an interactive response from the user by tapping an answer to a question presented on a display), etc. For example, a location-based audio tour may play a certain audio track upon determining that an individual is within a specified proximity of a particular geographical location. As another example, a podcast may play a certain audio track upon determining that certain keyword(s) are included in a verbal utterance spoken by the consumer of the podcast. Accordingly, the interfaces may enable end users to readily create interactive content-based experiences that improve consumer engagement, satisfaction, etc.

These interfaces may also allow end users to produce content-based experiences that can be dynamically modified by the media production platform. For example, as a computing device moves in the real world, advertisements corresponding to local merchants may be presented to an individual. As another example, as a computing device moves in the real world, different tracks of geotagged media content could be triggered. Consequently, a certain sound effect may be triggered when the computing device comes within a specified proximity of a GPS trigger point, while a certain vocal track (e.g., "Walk towards the counter and order a sandwich.") could be triggered when the computing device comes within a specified proximity of a Wi-Fi trigger point. These specified proximities may be automatically set by the media production platform and/or manually set by the end user designing the content-based experience.

Geotagged media content could be dynamically modified before or during runtime based on implicit actions and/or explicit actions of the user. For example, as a consumer walks quicker or slower, a timeline may be automatically modified (e.g., by adding content for slow walkers or by removing unnecessary breaks for fast walkers). As another example, if the consumer begins walking faster or slower, the speed of the media content can be increased or decreased by a certain percentage. Such modification can be made by the media production platform and/or by the software program executing on the computing device through which the consumer plays the media content.

These trigger points can be readily shown in-line with other aspects of the content-based experience using the interfaces described above. For example, trigger points may be embedded within a transcript in order to visually indicate when audio/video corresponding to certain transcript segments will begin playing. Moreover, certain trigger points could be shown on a map when the trigger points include geographical trigger points, such as GPS coordinates or WAP identifiers. The map may be accessible from, for example, the toolbar that extends across the top of the interfaces of FIGS. 3A-G.

Figure 5:
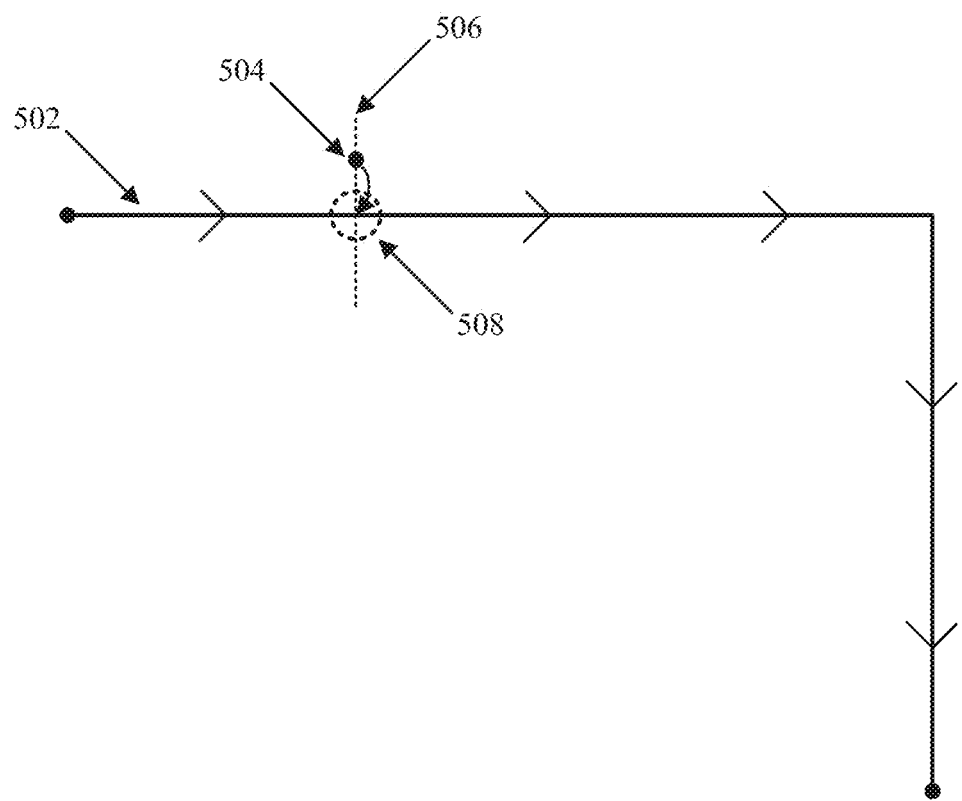
FIG. 5 depicts how the media production platform can intelligently monitor the location of a computing device (a process also referred to as "pathfinding").

FIG. 5 depicts how the media production platform can intelligently monitor the location of a computing device (a process also referred to as "pathfinding"). These techniques are particular valuable when the computing device is presenting location-based media content, such as a guided audio tour.

As noted above, a path can be created when a developer creates a content-based experience involving one or more types of media content. For example, a path could be constructed for a guided, location-based audio tour based on the placement of multiple geographical trigger points. When a consumer participates in the experience, the media production platform (or the software program responsible for presenting the media content) can determines what media content should be presented to the consumer by monitoring the consumer's location. For example, the media production platform may analyze geographical metadata uploaded by the computing device. Such action may occur periodically or continually. Geographical metadata may include GPS coordinates, WAP identifiers (e.g., a Wi-Fi router identifier), verbal indications (e.g., "I'm at the corner of Main Street and Green Street"), etc.

In some embodiments, the media production platform continually queries the computing device regarding its position so long as the available bandwidth or connectivity status meets a specified threshold. Should these measure(s) fall below the specified threshold, the media production platform may periodically query the computing device regarding its position. In some embodiments, the geographical metadata is uploaded by the software program (e.g., mobile application) executing on the computing device that is associated with, and supported by, the media production platform.

Often, the geographical metadata will indicate that the consumer has strayed from the intended path 502. This may be due to the natural inaccuracy of position tracking or user action (e.g., the consumer may be located on the wrong side of the street). In order to enable a seamless interactive experience, the media production platform can intelligently "snap" the consumer's location to the intended path 502. More specifically, the media production platform can determine the consumer's location 504 when the computing device enters or passes a specified area. Here, for example, when the consumer crosses the illustrated axis 506, the media production platform may act as though the consumer is actually present within the trigger point area 508. Such action allows the media production platform to facilitate a more seamless content-based experience, despite issues that may cause the consumer to stray from the intended path 502.

FIG. 6 depicts a flow diagram of a process 600 for producing media content and content-based experiences. Initially, a media file is uploaded by a developer to a media production platform (step 601). As shown in FIGS. 3A-G, the developer could upload the media file (here, an audio file) by posting the media file to a graphical user interface (GUI) created/supported by the media production platform. The GUI may be accessible on a computing device via some combination of a web browser, desktop software program, mobile application, or OTT application. For example, a mobile application executing on a mobile phone may be supported by the media production platform, which may be communicatively coupled to the mobile phone across a network. Such action may be facilitated by the use of application programming interfaces (APIs) that enable the software program and the media production platform to communicate directly with one another.

In some embodiments, the media production platform performs one or more speech recognition processes on the media file in order to automatically create a transcript for the media file (step 602). Alternatively, the developer may link the media file to a preexisting transcript (e.g., when the media file represents a recording of a script take by a voice actor). The media file and/or the transcript can then be stored as separate documents within a storage space accessible to the media production platform (step 603). In some embodiments, the media file and transcript are stored within a storage space associated with a project. Thus, the media file and transcript may both be associated with a certain content-based experience (e.g., a guided tour, lesson, or audiobook).

Generally, the media file and transcript are separately editable. The media production platform may globally effect edits made to either in near real time. Accordingly, the media production platform can enable the developer to perform in-line edits of the transcript via a GUI, and then effect identical or similar edits to the media file (and vice versa) (step 604). In some embodiments, the media production platform generates an interface that allows the developer insert media content directly into the transcript (e.g., via a drag-and-drop mechanism) or the waveform corresponding to the media file. For example, the developer may choose to insert video segments (e.g., advertisements), audio segments (e.g., music or sound effects), images, etc., directly into either file. Thus, the media production platform may also enable developers to manage other media content that could be added to a content-based experience.

The GUI may also permit the developer to insert one or more trigger points into the transcript and/or the media file (step 705). Trigger points allow the media production platform to intelligently switch between alternative outcomes (e.g., different audio tracks) based on whether certain criteria are satisfied. Such a feature operates similar to a video game engine in some respects. Trigger points could include GPS coordinates, WAP identifiers (e.g., a Wi-Fi router identifier), verbal utterances, physical interactions with a computing device (e.g., an interactive response from the user by tapping an answer to a question presented on a display), etc. For example, a location-based audio tour may play a certain audio track upon determining that an individual is within a specified proximity of a particular geographical location. As another example, a podcast may play a certain audio track upon determining that certain keyword(s) are included in a verbal utterance spoken by the consumer of the podcast. As yet another example, a podcast may play a certain audio track upon determining that the consumer has physically interacted with a computing device in a certain manner (e.g., by selecting an option visually presented on the display of the computing device).

The media production platform can then construct a content-based experience using the transcript and/or the media file (step 606). The content-based experience may be interactive in nature when sufficient trigger point(s) are included that allow the media production platform or a software program executing on a consumer's computing device to react to the consumer's action.

Unless contrary to physical possibility, it is envisioned that the steps described above may be performed in various sequences and combinations. For example, a developer could alternately edit multiple transcripts via a single GUI, and then construct a content-based experience by combining segment(s) from each transcript. Other steps could also be included in some embodiments.

Use Cases

Several of the interfaces introduced here enable nearly anyone who knows how to use a word processor to produce media content. Script-driven media production can be enabled by allowing end users to edit voice audio by editing text, and vice versa. Thus, end users can simply edit audio/video by editing text, rather than editing the corresponding waveforms (which can be a difficult, time-consuming process). Such technology can be particularly useful when creating location-based media content (also referred to as "geotagged media content"), podcasts, audiobooks, radio/television segments, etc.

Because several interfaces introduced here allow trigger points to be inserted directly into a transcript, end users (e.g., developers) can easily create interactive media content. Examples of interactive media content include television programs, radio programs, podcasts, audio tours (e.g., guided tours of cities, buildings, parks, or campuses), lessons, advertisements, games (e.g., augmented reality video games), etc.

Certain embodiments have been described in the context of audio files for the purpose of illustration only. Those skilled in the art will recognize that the technology is amenable to other forms of media content as well.

Processing System

Figure 7:
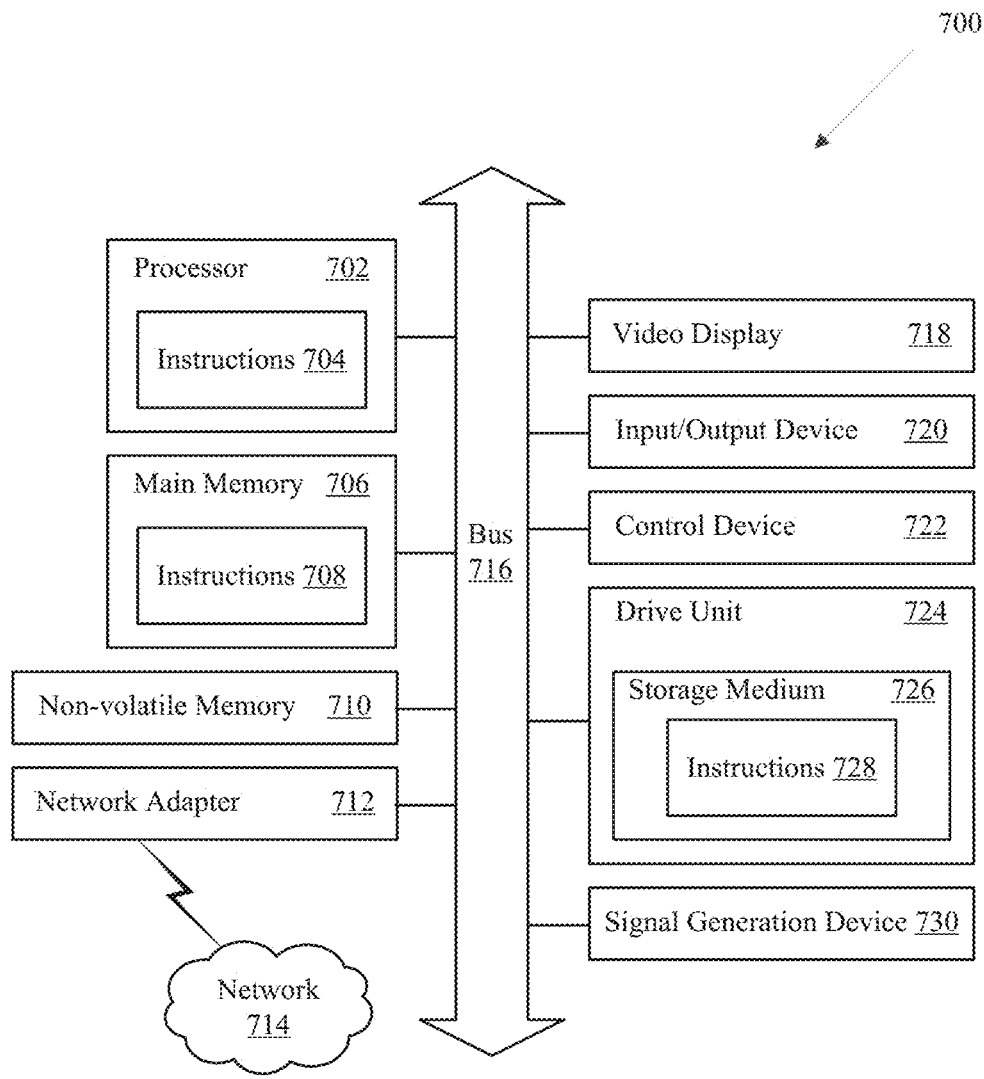
FIG. 7 is a block diagram illustrating an example of a processing system in which at least some operations described herein can be implemented.

FIG. 7 is a block diagram illustrating an example of a processing system 700 in which at least some operations described herein can be implemented. The processing system may include one or more central processing units ("processors") 702, main memory 706, non-volatile memory 710, network adapter 712 (e.g., one or more network interfaces), video display 718, input/output devices 720, control device 722 (e.g., keyboard/pointing devices), drive unit 724 including a storage medium 726, and signal generation device 730 that are communicatively connected to a bus 716.

The bus 716 is illustrated as an abstraction that represents one or more separate physical buses, point-to-point connections, or both that are connected by appropriate bridges, adapters, or controllers. Therefore, the bus 716 can include a system bus, Peripheral Component Interconnect (PCI) bus or PCI-Express bus, HyperTransport interface, Industry Standard Architecture (ISA) bus, Small Computer System Interface (SCSI) bus, Universal Serial Bus (USB), Inter-Integrated Circuit ($I^2C$ or I2C) bus, or Institute of Electrical and Electronics Engineers (IEEE) standard 1394 bus (also referred to as "Firewire").

In some embodiments the processing system 700 operates as part of a remote server system on which a media production platform is hosted, while in other embodiments the processing system 700 operates as part of a computing device (e.g., a mobile phone, tablet computer, or desktop computer) that is communicatively connected to the remote server system via a wired channel or a wireless channel. Moreover, the processing system 700 could also operate as part of a computing device that is not communicatively connected to any remote server systems. The processing system 700 share a similar computer processor architecture as that of a desktop computer, tablet computer, personal digital assistant (PDA), mobile phone, game console (e.g., Sony PlayStation® or Microsoft Xbox®), music player (e.g., Apple iPod Touch®), wearable electronic device (e.g., a watch or fitness band), network-connected ("smart") device (e.g., a television or home assistant device), virtual/augmented reality systems (e.g., a head-mounted display such as Oculus Rift® and Microsoft Hololens®), or another electronic device capable of executing a set of instructions (sequential or otherwise) that specify action(s) to be taken by the processing system 700.

While the main memory 706, non-volatile memory 710, and storage medium 726 (also referred to as a "machine-readable medium") are shown to be a single medium, the term "storage medium" should be taken to include a single medium or multiple media (e.g., centralized or distributed databases, and/or associated caches and servers) that store one or more sets of instructions 728. The term "storage medium" shall also be taken to include any medium that is capable of storing, encoding, or carrying a set of instructions for execution by the processing system 700 and that cause the processing system to perform any of the methodologies of the embodiments.

In general, the routines executed to implement the embodiments may be implemented as an operating system process or a dedicated application, component, program, object, module, or sequence of instructions (which are collectively referred to as "computer programs"). The computer program typically comprises one or more instructions (e.g., instructions 704, 708, 728) set at various times in various memory/storage devices in a computing device, and that, when read and executed by the processor(s) 702, cause the processing system 700 to perform operations to execute various aspects of the embodiments.

Moreover, while certain embodiments may be described in the context of fully functioning computing devices, those skilled in the art will appreciate that the embodiments are capable of being distributed as a software program product in a variety of forms. The disclosure applies equally regardless of the particular type of machine or computer-readable media used to actually effect the distribution.

Further examples of machine-readable (storage) media include recordable media such as volatile and non-volatile memory devices 710, floppy disks and other removable disks, hard disk drives, optical disks (e.g., Compact Disk Read-Only Memory (CD ROMS) and Digital Versatile Disks (DVDs)), and transmission media, such as digital communication links and analog communication links.

The network adapter 712 enables the processing system 700 to mediate data in a network 714 with an entity that is external to the processing system 700 through any known/convenient communications protocol supported by the processing system 700 and the external entity. For example, the processing system 700 and the external entity may communicate via Wi-Fi, Bluetooth®, Near Field Communication (NFC), cellular, infrared, radio-frequency identification (RFID), etc. Accordingly, the network adapter 712 can include a network adaptor card, a wireless network interface card, a router, an access point, a wireless router, a switch, a multilayer switch, a protocol converter, a gateway, a bridge, a bridge router, a hub, a digital media receiver, a repeater, etc.

The techniques introduced here can be implemented by, for example, programmable circuitry (e.g., one or more microprocessors) programmed with software and/or firmware, special-purpose hardwired (i.e., non-programmable) circuitry, or in a combination of such forms. Circuitry can be in the form of application-specific integrated circuits (ASICs), programmable logic devices (PLDs), field-programmable gate arrays (FPGAs), etc.

Remarks

The foregoing examples of various embodiments have been provided for the purposes of illustration and description. These examples are not intended to be exhaustive. Many variations will be apparent to one skilled in the art. Certain embodiments were chosen in order to best describe the principles of the technology introduced herein, thereby enabling others skilled in the relevant art to understand the claimed subject matter, the various embodiments, and the variations that may be suited to particular uses.

The language used in the specification has been principally selected for readability and instructional purposes. It may not have been selected to delineate or circumscribe the subject matter. Therefore, it is intended that the scope of the technology be limited not by this specification, but rather by any claims that issue based hereon. Accordingly, the disclosure of the technology is intended to be illustrative (rather than limiting) of the scope of the technology, which is set forth in the following claims.

What is claimed is:

1. A non-transitory computer-readable medium with instructions stored thereon that, when executed by a processor of a computing device, cause the computing device to perform operations comprising:
   causing display of a transcript in an interface;
   receiving first input indicative of an addition of a word into the transcript, the word being preceded by one or more words and succeeded by one or more words;
   identifying an audio file that is programmatically linked to the transcript on a word basis or a phoneme basis;
   synthesizing a first audio segment in which the word is spoken based on a characteristic of a speaker that is associated with the audio file by:
      determining phonemes needed to construct the first audio segment from a second audio segment that corresponds to the preceding one or more words or a third audio segment that corresponds to the succeeding one or more words, and
      combining the determined phonemes derived from the second audio segment or the third audio segment, so as to construct the first audio segment; and
   inserting the first audio segment into the audio file, such that the first audio segment is preceded by the second audio segment and followed by the third audio segment.

2. The non-transitory computer-readable medium of claim 1, wherein the operations further comprise:
   receiving second input indicative of an instruction to perform a blending operation to address unnatural audio discrepancies creating by the insertion of the first audio segment; and
   blending the first, second, and third audio segments to create a more natural transition between the first, second, and third audio segments.

3. The non-transitory computer-readable medium of claim 2, wherein said blending includes varying volume, tone, or speed of at least a portion of the first audio segment, at least a portion of the second audio segment, and/or at least a portion of the third audio segment.

4. The non-transitory computer-readable medium of claim 1, wherein said synthesizing is performed in response to receiving a second input that is indicative of an instruction to perform a synthesizing operation.

5. The non-transitory computer-readable medium of claim 1, wherein said synthesizing is performed in response to said receiving, and wherein said inserting is performed in response to said synthesizing.

6. The non-transitory computer-readable medium of claim 5, wherein the operations further comprise:
   receiving second input indicative of a deletion of a second word from the transcript;
   removing a fourth audio segment that corresponds to the second word from the audio file, the fourth audio segment being preceded by a fifth audio segment and followed by a sixth audio segment;
   receiving third input indicative of an instruction to perform a blending operation to address unnatural audio discrepancies created by the removal of the fourth audio segment; and
   blending the fifth and sixth audio segments to create a more natural transition between the fifth and sixth audio segments.

7. The non-transitory computer-readable medium of claim 6, wherein said blending includes varying volume, tone, or speed of at least a portion of the fifth audio segment and/or at least a portion of the sixth audio segment.

8. The non-transitory computer-readable medium of claim 6, wherein said blending includes matching volume, tone, or speed of one or more words spoken near an end of the fifth audio segment with one or more words spoken near a beginning of the sixth audio segment.

9. The non-transitory computer-readable medium of claim 6, wherein the operations further comprise:
   receiving fourth input indicative of a selection of one or more words in the transcript that correspond to the fifth audio segment; and
   receiving fifth input indicative of a selection of one or more words in the transcript that correspond to the sixth audio segment;
   wherein said blending is based on the fourth and fifth inputs.

10. The non-transitory computer-readable medium of claim 6, wherein said blending results in a volume of the fifth segment matching a volume of the sixth segment.

11. The non-transitory computer-readable medium of claim 6, wherein said blending results in a tone of the fifth segment matching a tone of the sixth segment.

12. The non-transitory computer-readable medium of claim 6, wherein said blending results in a speed of the fifth segment matching a speed of the sixth segment.

13. The non-transitory computer-readable medium of claim 6, wherein the third input is representation of a selection, via the interface, of a graphical element that corresponds to a blend option.

* * * * *